US012710742B1

(12) United States Patent
Nguyen

(10) Patent No.: US 12,710,742 B1
(45) **Date of Patent: *Aug. 18, 2026**

(54) ALIAS VISUALIZATION

(71) Applicant: Yokogawa Electric Corporation, Tokyo (JP)

(72) Inventor: Vien Nguyen, Frisco, TX (US)

(73) Assignee: Yokogawa Electric Corporation, Tokyo (JP)

( * ) Notice: Subject to any disclaimer, the term of this patent is extended or adjusted under 35 U.S.C. 154(b) by 396 days.

This patent is subject to a terminal disclaimer.

(21) Appl. No.: 18/371,804

(22) Filed: Sep. 22, 2023

(51) Int. Cl.
*G05B 19/4155* (2006.01)

(52) U.S. Cl.
CPC .................... *G05B 19/4155* (2013.01); *G05B 2219/31368* (2013.01)

(58) Field of Classification Search
CPC .................. G05B 19/4155; G05B 2219/31368
USPC ............................................................ 700/28
See application file for complete search history.

(56) References Cited

U.S. PATENT DOCUMENTS

2018/0089328 A1* 3/2018 Bath ..................... G06F 16/901
2019/0355228 A1* 11/2019 Rischar .................. G08B 31/00
2020/0050607 A1* 2/2020 Pal ...................... G06F 16/2471
2021/0117425 A1* 4/2021 Rao ..................... H04L 41/0806
2021/0342337 A1* 11/2021 Lu ......................... G06F 11/324
2021/0342394 A1* 11/2021 Fletcher .................. H04L 41/22
2024/0281430 A1* 8/2024 Nigam ................ G06F 16/2365

FOREIGN PATENT DOCUMENTS

CN 111600739 8/2020
CN 113641364 11/2021

* cited by examiner

*Primary Examiner* — Md Azad
(74) *Attorney, Agent, or Firm* — Gray Ice Higdon

(57) ABSTRACT

Implementations are described herein for providing a GUI that is designed to visualize how aliases are assigned and/or distributed in a process automation facility. In various implementations, alias registration data associated with distributed control nodes (DCNs) of a process automation facility may be retrieved. The alias registration data may include mappings between connection strings of input/output (I/O) channels made accessible by the DCNs and aliases registered to the I/O channels. A graphical user interface (GUI) may be rendered with graphical elements that visualize at least some of the DCNs and at least some of the mappings between the connection strings and the aliases. The mappings may be analyzed to detect irregularities among the registered aliases. One or more of the graphical elements of the GUI that correspond to the one or more detected irregularities among the registered aliases may be visually emphasized.

20 Claims, 7 Drawing Sheets

228
DCN 210-1
FT
214-1
"MAIN FT"
THERMOMETER
218-2
"AUX TEMP"
230
DCN 210-4
THERMOMETER
218-1
"MAIN TEMP"
"MAIN FT"
"MAIN TEMP"
SUGGESTED:
"MAIN TEMP"
DCN 210-2
ACTUATOR
216-1
"MAIN VALVE"
DCN 210-3
ACTUATOR
216-2
"AUX VALVE"

RETRIEVE ALIAS SUBSCRIPTION DATA ASSOCIATED WITH A PLURALITY OF DISTRIBUTED CONTROL NODES (DCNS) OF A PROCESS AUTOMATION FACILITY, WHEREIN THE ALIAS SUBSCRIPTION DATA INCLUDES A LIST OF SUBSCRIPTIONS BY AT LEAST SOME OF THE PLURALITY OF DCNS TO ALIASES REGISTERED TO A PLURALITY OF PROCESS AUTOMATION NODES MADE ACCESSIBLE BY THE PLURALITY OF DCNS
502

CAUSE GUI TO BE RENDERED THAT INCLUDES GRAPHICAL ELEMENTS THAT VISUALIZE AT LEAST SOME OF THE PLURALITY OF DCNS AND AT LEAST SOME OF THE SUBSCRIPTIONS
504

COMPARE THE ALIAS SUBSCRIPTION DATA TO ALIAS REGISTRATION DATA TO DETECT IRREGULARITIES, WHEREIN THE ALIAS REGISTRATION DATA INCLUDES MAPPINGS BETWEEN CONNECTION STRINGS OF THE PLURALITY OF PROCESS AUTOMATION NODES AND ALIASES REGISTERED TO THE PLURALITY OF PROCESS AUTOMATOIN NODES
506

BASED ON THE ONE OR MORE DETECTED IRREGULARITIES, CAUSE THE GUI TO BE UPDATED TO VISUALLY EMPHASIZE ONE OR MORE OF THE GRAPHICAL ELEMENTS OF THE GUI THAT CORRESPOND TO ONE OR MORE DETECTED IRREGULARITIES
508

Fig. 5

ALIAS VISUALIZATION

BACKGROUND

Process automation facilities may include myriad nodes, such as sensors, actuators, and distributed control nodes (DCNs) that host sensors, actuators, and control applications (e.g., function blocks), among other components. Tracking these nodes using traditional connection strings may present various challenges. Connection strings, which may include networking information such as IP addresses and TCP/UDP ports of individual nodes, as well as node IDs used to identify individual nodes that are accessible via those nodes, are not readily interpretable by humans, and do not easily scale. Accordingly, the Open Platform Communications Unified Architecture (OPC UA) standard specifies a Global Discovery Server (GDS) that provides an "Alias Name Service" (ANS) that facilitates the aggregation and mapping/resolution of aliases (strings of characters that are human-readable/meaningful) to OPC UA nodes. In other words, the GDS can act like a "phone book" for OPC UA clients.

SUMMARY

Aliases are often defined in batches, e.g., by way of an alias configuration file that includes a list of aliases and corresponding references. The alias configuration file can be provided to a configuration tool, which creates aliases and causes the corresponding DCNs to register those aliases with the GDS. Over time, changes may occur to the process automation facility. For example, additional aliases may be registered separately, hardware may fail and/or may be replaced, and so forth. Additionally, during design time, an alias may be defined as a logical string representation of and/or a placeholder for a process automation node that may not yet exist or that has not yet been commissioned to the process automation network.

Implementations described herein relate to providing a graphical user interface (GUI) that is designed to visualize how aliases are assigned and/or distributed in a process automation facility, e.g., by visually providing a topology map of the process automation network and its nodes. More particularly, but not exclusively, implementations are described herein for rendering a GUI that efficiently brings to the user's attention various irregularities associated with aliases, especially in the OPC context. These irregularities may include, but are not limited to, duplicate and/or conflicting aliases (e.g., the same alias assigned to two or more different I/O channels), orphan aliases (that reference nodes that have been deactivated or that have not yet been added/commissioned), orphan cross-platform (e.g., OPC UA) servers that are hosted by DCNs that crash unexpectedly, are decommissioned without being properly unregistered from the GDS first, and so forth.

In some implementations, a method may be implemented using one or more processors and may include: retrieving alias registration data associated with a plurality of distributed control nodes (DCNs) of a process automation facility, wherein the alias registration data includes mappings between connection strings of a plurality of process automation nodes made accessible by the plurality of DCNs and aliases registered to the plurality of I/O channels, wherein the plurality of process automation nodes include input/output (I/O) channels and function blocks that execute on the plurality of DCNs; causing a graphical user interface (GUI) to be rendered, wherein the GUI includes a plurality of graphical elements that visualize at least some of the plurality of DCNs and at least some of the mappings between the connection strings of the plurality of process automation nodes and the aliases; analyzing the mappings to detect one or more irregularities among the registered aliases; and causing one or more of the graphical elements of the GUI that correspond to the one or more detected irregularities among the registered aliases to be visually emphasized.

In various implementations, the one or more detected irregularities may include the same alias being assigned to two different I/O channels, or an orphan alias assigned to an I/O channel that is unavailable. In various implementations, the alias registration data may further include cross-platform servers that control access to the plurality of process automation nodes.

In various implementations, the plurality of I/O channels may include at least one sensor and at least one actuator. In various implementations, the mappings may be retrieved from a GDS. In various implementations, the mappings may be retrieved from at least some of the plurality of DCNs.

In various implementations, the method may further include retrieving local alias registration data from one or more of the plurality of DCNs, wherein the local alias registration data comprises local mappings between subscribed-to aliases and process automation nodes to which the subscribed-to aliases are registered. In various implementations, at least some of the graphical elements of the GUI may visualize at least some of the local mappings.

In various implementations, one or more of the graphical elements of the GUI that correspond to the one or more detected irregularities among the registered aliases may be rendered as interactive elements that, when actuated, cause candidate remedial actions to be presented for selection.

In a related aspect, a method may be implemented using one or more processors and may include: retrieving alias subscription data associated with a plurality of DCNs of a process automation facility, wherein the alias subscription data includes a list of subscriptions by at least some of the plurality of DCNs to aliases registered to a plurality of process automation nodes made accessible by the plurality of DCNs, wherein the plurality of process automation nodes include input/output (I/O) channels and function blocks that execute on the plurality of DCNs; causing a graphical user interface (GUI) to be rendered, wherein the GUI includes a plurality of graphical elements that visualize at least some of the plurality of DCNs and at least some of the subscriptions; comparing the alias subscription data to alias registration data to detect one or more irregularities, wherein the alias registration data includes mappings between connection strings of the plurality of process automation nodes and the aliases registered to the plurality of process automation nodes; and based on the one or more detected irregularities, causing the GUI to be updated to visually emphasize one or more of the graphical elements of the GUI that correspond to one or more detected irregularities.

In various implementations, the one or more detected irregularities may include the same alias being assigned to two different I/O channels. In various implementations, the one or more detected irregularities may include a DCN being subscribed to an orphan alias that is assigned to a process automation node that is unavailable. In various implementations, the plurality of I/O channels may include at least one sensor and at least one actuator.

In various implementations, the alias subscription data may be retrieved from a GDS. In various implementations, the alias subscription data may be retrieved from at least some of the plurality of DCNs. In various implementations, one or more of the graphical elements of the GUI that correspond to the one or more detected irregularities may be rendered as interactive elements that, when actuated, cause candidate remedial actions to be presented for selection.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 5 schematically illustrates another example method for performing selected aspects of the present disclosure.

DETAILED DESCRIPTION

Figure 1:
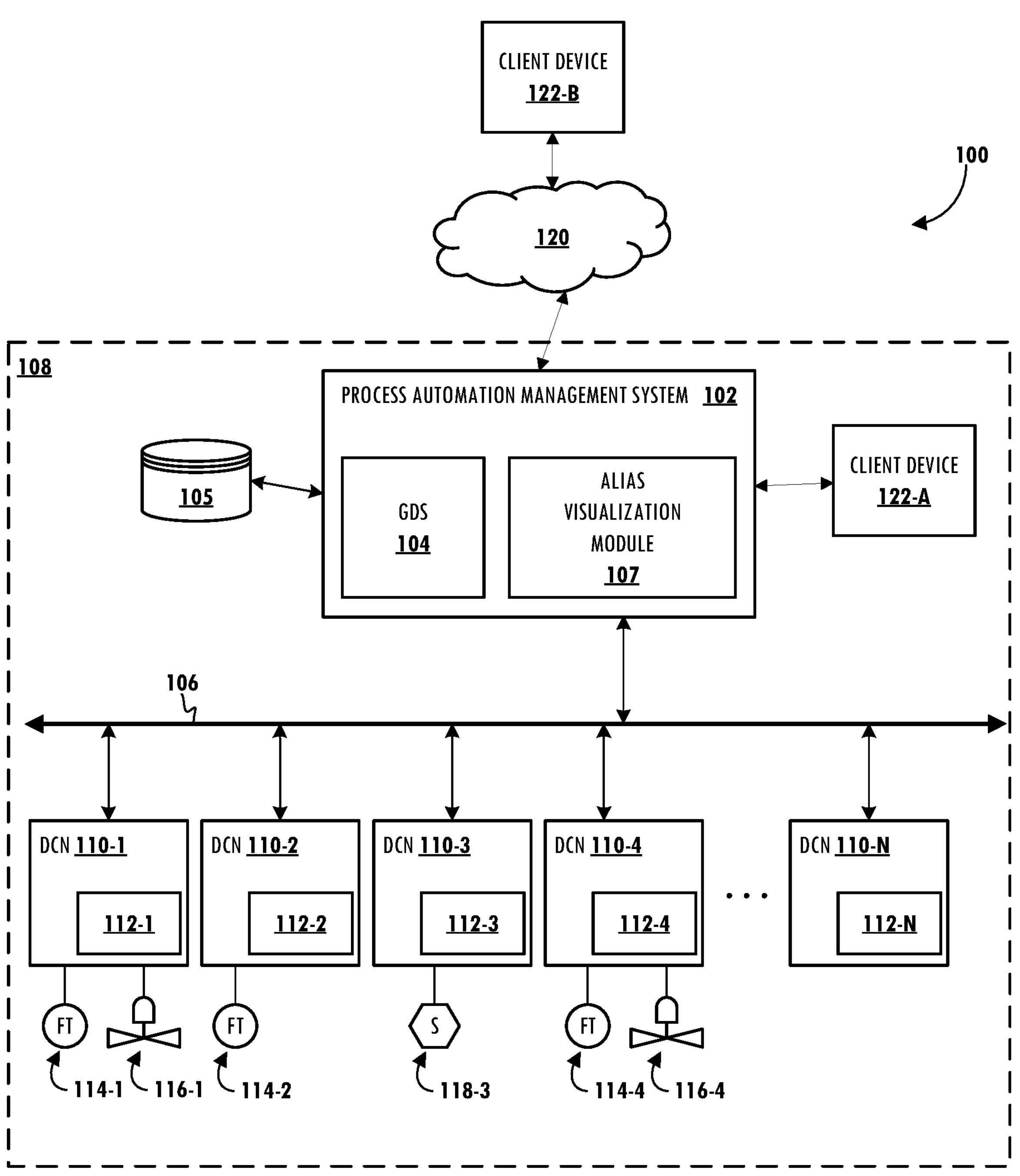
FIG. 1 schematically depicts an environment in which selected aspects of the present disclosure may be implemented, in accordance with various embodiments.

Implementations described herein relate to providing a GUI that is designed to visualize how aliases are assigned and/or distributed in a process automation facility, e.g., by visually providing a topology map of the process automation network and its constituent process automation nodes. More particularly, but not exclusively, implementations are described herein for rendering a GUI that efficiently brings to the user's attention various irregularities associated with aliases, especially in the OPC context. These irregularities may include, but are not limited to, duplicate aliases (e.g., the same alias assigned to two or more different I/O channels or function blocks), orphan aliases (that reference process automation nodes that are no longer available or that have not yet been commissioned), orphan cross-platform (e.g., OPC UA) servers that are hosted by DCNs that crash unexpectedly, are decommissioned without being unregistered from the GDS first, and so forth.

Alias irregularities may be detected and/or visualized in various ways. In some implementations, mappings between aliases and connections strings of process automation nodes (e.g., I/O channels or function blocks) made accessible by DCNs/cross-platform servers to which the aliases are registered may be retrieved; this data may be referred to herein as "alias registration data." Alias registration data may be retrieved by one or more computing devices that will be providing a GUI configured with selected aspects of the present disclosure, such as the GDS, a DCN, a client device connected to the process automation network, etc. Alias registration data may be useable, alone or with other data, to render a GUI configured with selected aspects of the present disclosure.

In other implementations, alias irregularities may be detected and/or visualized by analyzing alias subscription data that includes subscriptions by DCN(s)/cross-platform clients to I/O channel(s) and/or function blocks to which alias(es) are registered. In some such implementations, alias subscription data may be compared to alias registration data. Based on this comparison, various irregularities can be detected.

Suppose an alias is used initially to retrieve a connection string of a particular I/O channel of a particular DCN, and that this retrieved connection string is then used to subscribe a particular cross-platform client to the particular I/O channel. If the functionality of that particular I/O channel is shifted to a new DCN, and the subscribing cross-platform client is not updated to the new connection string of the I/O channel on the new DCN, the subscribing cross-platform client may continue to attempt to retrieve data via the old connection string. If another I/O component is now providing data at the old connection string, the subscribing cross-platform client may mistakenly continue using the now-inapplicable data and may perform action(s) that may have deleterious consequences. If no I/O component is providing data at the old connection string, the subscribing cross-platform client may fail to perform some task, which also can be deleterious if not catastrophic.

Mappings between process automation nodes and aliases registered to those process automation nodes may be represented in the GUI using various types of graphical elements. In some implementations, visual elements corresponding to DCNs may be rendered, e.g., as nodes in a graph that includes edges representing communication channels and/or subscriptions between the nodes. Each node may be rendered with one or more I/O channels and/or function blocks. Those I/O channels and/or function blocks may be visually annotated with one or more aliases registered to those I/O channels and/or function blocks. Subscriptions between DCNs/cross-platform clients may be represented by the aforementioned edges, which themselves may be annotated, e.g., with aliases that were used originally to establish the subscriptions.

In various implementations, visual annotations corresponding to detected alias irregularities may be rendered as interactive elements. When actuated, in some implementations, a list of candidate remedial actions may be presented, e.g. audibly or on a display. For example, clicking on an error message about an alias may cause a drop-down menu to be rendered with selectable options corresponding to candidate remedial actions. These candidate remedial actions may include, for instance, automatically and/or manually assigning new aliases, verifying irregularities (e.g., with a GDS), and/or ignoring the warnings.

Referring now to FIG. 1, an example environment 100 in which various aspects of the present disclosure may be implemented is depicted schematically. A process automation management system 102 is operably coupled with a process automation network 106 in a process automation facility 108. Process automation facility 108 may take numerous forms and may be designed to implement any number of at least partially automated processes. For example, process automation facility 108 may take the form of a chemical processing plant, an oil or natural gas refinery, a catalyst factory, a manufacturing facility, an offshore oil platform, etc.

Process automation network 106 may be implemented using various wired and/or wireless communication technologies, including but not limited to the Institute of Electrical and Electronics Engineers (IEEE) 802.3 standard (Ethernet), IEEE 802.11 (Wi-Fi), cellular networks such as 3GPP Long Term Evolution ("LTE") or other wireless protocols that are designated as 3G, 4G, 5G, and beyond, and/or other types of communication networks of various types of topologies (e.g., mesh). Process automation is often employed in scenarios in which the cost of failure tends to be large, both in human safety and financial cost to stakeholders. Accordingly, in various implementations, process automation network 106 may be configured with redundancies and/or backups to provide high availability (HA) and/or high quality of service (QoS).

Process automation management system 102 may include a Global Discovery Server (GDS) 104, an alias visualization module 107, and a database 105 that stores information used by GDS 104 and/or alias visualization module 107 to practice selected aspects of the present disclosure. Various aspects of process automation management system 102, such as GDS 104 and/or alias visualization module 107, may be implemented using any combination of hardware and software. In some implementations, process automation management system 102 may be implemented across multiple computer systems as part of what is often referred to as a "cloud infrastructure" or simply the "cloud." However, this is not required, and in FIG. 1, for instance, process automation management system 102 is implemented within process automation facility 108, e.g., in a single building or across a single campus of buildings or other industrial infrastructure. In such an implementation, process automation management system 102 may be implemented on one or more local computing systems, such as on one or more server computers.

In addition to process automation management system 102, a variety of other nodes are operably coupled with process automation network 106. In FIG. 1, for instance, N (positive integer) DCNs 110-1 to 110-N are operably coupled with process automation network 106. Each DCN may include circuitry or logic 112 that may take various forms, such as processor(s) that execute instructions in memory, a field-programmable gate array (FPGA), an application-specific integrated circuit (ASIC), and so forth. Each DCN 110 may have a particular role to play in process automation network 106. "Compute" DCNs may, for instance, control a process loop (e.g., a chemical process loop) in which various "field" devices (e.g., devices having sensors and/or actuators) interface with each other to perform some number of function control blocks (FBs). While not depicted in FIG. 1, in various implementations, each DCN may execute a cross-platform server that orchestrates access to the DCN's constituent I/O channels. Additionally or alternatively, each DCN may operate a cross-platform client that is configured to subscribe to I/O channels (e.g., made accessible by the aforementioned cross-platform server) in order to receive information needed for the DCN to perform some function.

Each DCN 110 may have various I/O components, which are accessible as "channels," and which dictate at least some of its operational technology (OT) capabilities and, more generally, its role at process automation facility 108. For example, first DCN 110-1 includes a flow transmitter (FT) component 114-1 and an actuator (e.g., a valve) 116-1. In some implementations, a software component implemented on DCN 110-1 (or any other DCN mentioned herein) may transform an analog signal to digital; and/or convert the signal between different units of measurement, for instance. In addition, in some implementations, a software component implemented on DCN 110-1 may be configured to translate data between various protocols. For example, a particular vendor's DCN (or other legacy device) may not be configured natively to communicate data using the OPC Unified Architecture (OPC UA). In some such implementations, another DCN 110 may be deployed to translate this data from the vendor's proprietary format to OPC UA. Some such DCNs 110 may be referred to as "gateways" or "bridges" because they form a link between legacy technology and standards such as OPC UA.

Actuator 116-1 (and other actuators described herein) may be any electric, hydraulic, mechanical, and/or pneumatic component that is controllable to affect some aspect of a process automation workflow that occurs at process automation facility 108. In many cases, an actuator 116 may perform its function in response to various signals, such as sensor signals or commands from compute DCNs (which themselves may monitor for sensor signals). Some non-limiting examples of actuators 116 include, but are not limited to, valves, pistons, rotors, switches, heaters, coolers, stirrers, injectors, devices to create vacuums, belts, tracks, gears, grippers, motors, relays, servomechanisms, etc.

Each DCN 110 may have different OT capabilities with respect to one or more (e.g., all) other DCNs 110. In FIG. 1, for instance, second DCN 110-2 includes a FT component 114-2 but no actuator. Third DCN 110-3 includes a sensor 118-3 but no actuator. Sensor 118-3 (and elsewhere herein) may take various forms, including but not limited to a pressure sensor, a temperature sensor, a flow sensor (e.g., FT component 114), various types of proximity sensors, a light sensor (e.g., a photodiode), a pressure wave sensor (e.g., microphone), a humidity sensor (e.g., a humistor), a radiation dosimeter, a laser absorption spectrograph (e.g., a multi-pass optical cell), and so forth. Like first DCN 110-1, fourth DCN 110-4 also includes both a FT component 114-4 and an actuator 116-4.

Unlike DCNs 110-1 to 110-4, DCN 110-N does not include any input/output (actuators or sensors) components. Instead, DCN 110-N may be a "compute only" DCN whose role is to facilitate cooperation between itself and one or more other DCNs 110 on process automation network 106 to implement an at least partially automated process. For example, DCN 110-N may control a single process loop (e.g., a chemical process control loop) that involves one or more other DCNs 110. In some cases, a compute DCN 110 may perform a role similar to an autopilot on an airplane—the compute DCN 110 may receive various signals and, based on those signals and various criteria and/or thresholds, control various actuators. For example, the compute DCN 110 may monitor various sensors 118 to ascertain data about chemical levels, flow rates (e.g., across valves), tank temperatures, control rates, etc., and may control one or more actuators 116 based on these data and/or comparisons of these data to various criteria and/or thresholds. For instance, compute DCN 110-N can control actuator 116-4 by transmitting, to DCN 110-4, corresponding command(s) that can optionally conform to a protocol that is specific to DCN 110-4.

Many DCNs may have multiple physical I/O components, and hence, multiple I/O channels that can be accessed, e.g., by other devices or systems such as other DCNs, GDS 104, alias visualization module 107, etc. For example, each DCN 110 may host a cross-platform server, such as an OPC UA server, that provides access to various data sources of the DCN 110, including the DCN's I/O channels. A cross-platform client application, such as an OPC UA client operating on a DCN 110, may connect to a server hosted by the DCN so that it can read data from input channels associated with, for instance, sensors such as FT components 114, sensors 118, etc. Likewise, the client application may connect to the server hosted by the DCN to write data to output channels, e.g., to provide control signals or commands to actuators 116.

As noted above, tracking the myriad data sources (e.g., I/O channels and/or other data sources) of DCNs deployed across a complex process automation facility 108 using typical connection strings (e.g., networking information plus node IDs) may present various challenges. Connection strings of individual nodes, which may include Internet Protocol (IP) addresses and/or Transmission Control Protocol (TCP) ports, as well as node IDs used to identify individual components that are accessible via those nodes, are not readily interpretable by or meaningful to humans, and do not easily scale. Hence, GDS 104 is used to assign human-interpretable and/or meaningful aliases to the various data sources made available by the DCNs.

As an example, a OPC UA server executing on a DCN 110 may be reachable, e.g., by an OPC UA client, using the following networking information:

opc.tcp://10.0.1.1:4840

The characters "opc.tcp" may specify a connection protocol to be used. The numbers "10.0.1.1" may be an IP address of the DCN executing the OPC UA server. The numbers "4840" may be the TCP port to which the OPC UA server is listening and accepting connections. This OPC UA server may in turn provide access to multiple data sources, such as I/O channels or other pieces of data (e.g., sensor readings stored in memory, results of calculations, semaphore values, etc.). Each of these individual data sources may be referenced using a Node ID, such as:

ns=5;i=5242

An OPC UA client, and by extension, a person controlling it, may need to know both these unintuitive and/or cryptic values in order to access the particular data source.

Accordingly, OPC UA servers executing on DCNs can register aliases to GDS 104 using an Alias Name Server (ANS). This allows an alias to be created that maps a human-interpretable alias (e.g., "MyAlias1") to the connection string set forth above. In other words, an alias identifies, for OPC UA clients, which OPC UA server, and where on that OPC UA server, a particular data source can be accessed. Later, an OPC UA client seeking to access the data source may query GDS 104 using an alias (e.g., "MyAlias1"). GDS 104 may respond by providing networking information including the corresponding connection string. The OPC UA client can then use this connection string to establish a connection to the corresponding OPC UA server, and read data from and/or write data (e.g., control signals or commands) to the data source.

As noted previously, aliases are often defined in batches, e.g., by way of a configuration file that includes a list of aliases and corresponding connection strings. The configuration file can be provided to a configuration tool, which creates aliases and causes the corresponding DCNs to register those aliases with GDS 104. Over time, changes may occur to process automation facility 108, and those changes may cause the system integrator's original configuration file and/or local alias databases stored on DCNs to become stale. For example, additional aliases may be registered separately at individual DCNs, hardware may fail and/or may be replaced, and so forth. Accordingly, alias visualization module 107 may be configured with selected aspects of the present disclosure to detect irregularities in aliases and/or subscriptions to aliases, and to render a GUI that visualizes these irregularities for a user. As used herein, an "irregularity" is a phenomenon or state that is different than expected, but not necessarily invalid or prohibited. Non-limiting examples of an irregularity include an "orphan alias" (e.g., a now defunct alias still being relied upon by a subscriber DCN without up-to-date knowledge, or an alias that is defined for a yet-to-be-commissioned node), duplicate aliases (which may not be expressly forbidden, but which may warrant caution), and so forth.

Also depicted in FIG. 1 are a local client device 122-A and a remote client device 122-B. These client devices may be operable by personnel such as system integrators to configure and/or interact with various aspects of process automation management system 102. For example, a user may operate a client device 122 to connect an OPA UA client executing on one DCN 110 to an OPC UA server executing on another DCN 110. Local client device 122-A may be connected to process automation management system 102 via one or more local area networks, such as 106. Remote client device 122-B may connect to process automation management system 102 via one or more wide area networks (120), such as the Internet.

In various implementations, alias visualization module 107, other components of process automation management system 102 such as GDS 104, and/or client devices 122-A and/or 122-B, may be configured to monitor aliases in the process automation facility 108. In some implementations, alias visualization module 107 may be configured to monitor (periodically, continuously, on demand, in response to certain events, etc.) alias registration data. As noted previously, alias registration data may include mappings between connection strings of a plurality of I/O channels made accessible by the plurality of DCNs and aliases registered to connection strings of the plurality of I/O channels.

Alias registration data may be global and/or local. Global alias registration data may be obtained by alias visualization module 107 from, for instance, GDS 104. For example, alias visualization module 107 may periodically query GDS 104 for a global list of aliases and corresponding connection strings registered to those aliases. Local alias registration data may be obtained by alias visualization module 107 from, for instance, individual DCNs 110. Using the global and/or local alias registration data, alias visualization module 107 may be able to identify various types of irregularities. Alias visualization module 107 may cause a GUI rendered on a display to visually emphasize these irregularities.

In some implementations, alias visualization module 107 may compare global and local alias registration data to detect irregularities. Based on this comparison, alias visualization module 107 may detect irregularities such as local mappings between aliases and connection strings that are not aligned with corresponding global mappings, which suggests the local mappings are no longer valid (e.g., an orphan alias).

Additionally or alternatively, in some implementations, alias visualization module 107 may be configured to detect irregularities based on global and/or local alias registration data standing alone. For example, alias visualization module 107 may analyze global alias registration data to detect duplicate aliases assigned to different connection strings. While not necessarily forbidden, duplicate aliases may nonetheless confuse human personnel and therefore may be flagged for potential remedial action.

In some implementations, alias visualization module 107 may be configured to monitor alias subscription data that includes a list of subscriptions by the DCNs to aliases registered to connection strings of I/O channels made accessible by the DCNs. Alias visualization module 107 may cause a GUI to be rendered, e.g., on client device 122-A and/or 122-B, that includes a plurality of graphical elements that visualize at least some of the DCNs and at least some of the subscriptions. In some implementations, alias visualization module 107 may compare the alias subscription data to alias registration data to detect one or more irregularities. As noted previously, the alias registration data may include global and/or local mappings between connection strings of the I/O channels and the aliases registered to the I/O channels. Based on the detected irregularities, alias visualization module 107 may cause the GUI to be updated to visually emphasize graphical elements that correspond to detected irregularities.

Figure 2A:
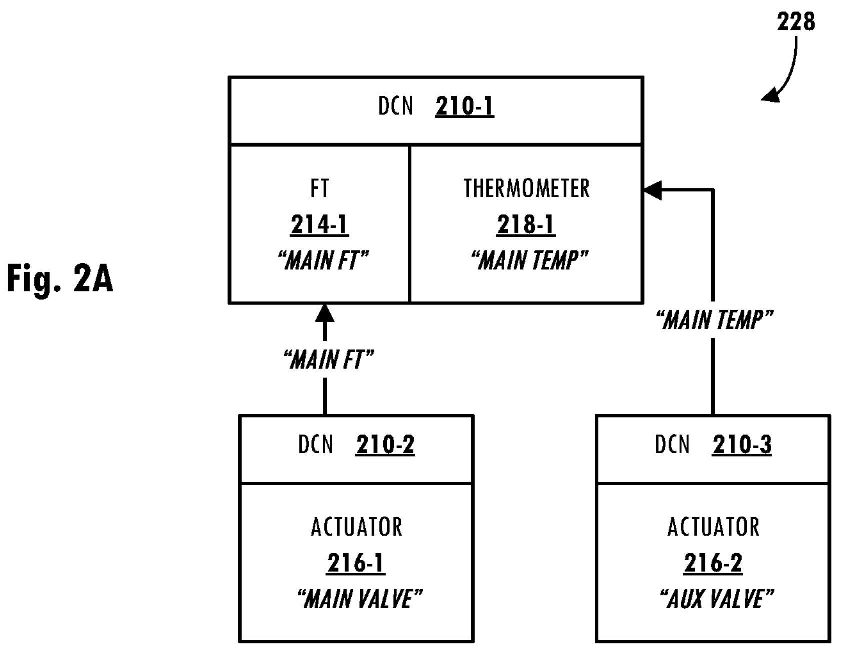
FIG. 2A, FIG. 2B, and FIG. 2C schematically depict examples of how techniques described herein may be implemented, in accordance with various embodiments.
Figure 2B:
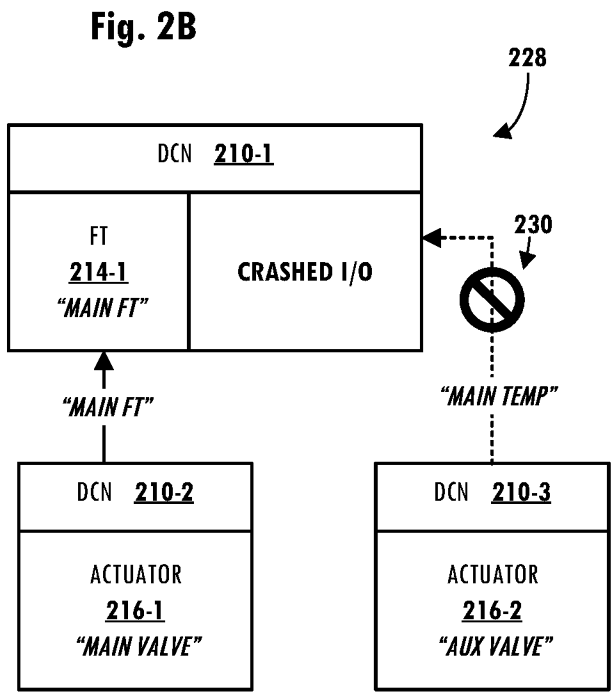
Figure 2C:
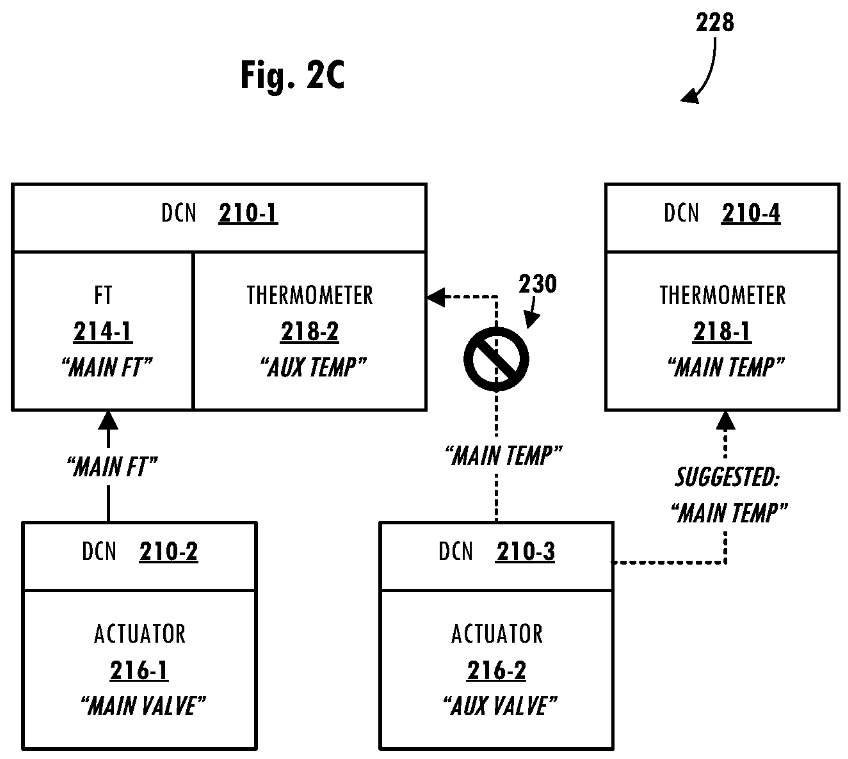

FIGS. 2A, 2B, and 2C schematically depict examples of how techniques described herein may be implemented, in accordance with various embodiments. FIG. 2A depicts a GUI 228 that includes a visual rendition of a portion of a process automation network that includes graphical elements 210-1 to 210-3 corresponding to three real world DCNs. First graphical element 210-1 represents a DCN that includes two I/O components: a FT component 214-1 and a thermometer 218-1. FT component 214-1 (and its corresponding connection string, not depicted) has been registered to the alias "MAIN FT." Thermometer 218-1 (and its corresponding connection string, not depicted) has been registered to the alias "MAIN TEMP."

Second graphical element 210-2 represents a second real world DCN (not depicted) that includes an actuator 216-1 registered to the alias "MAIN VALVE." As shown by GUI 228, the second real world DCN represented by second graphical element 210-2 is subscribed to one or more I/O channels of the DCN represented by graphical element 210-1. In particular, second DCN 210-2 (which will now be used to refer to the represented DCN, as well as the graphical element, for the sake of brevity) is subscribed to the MAIN FT alias. This may be because, for instance, second DCN 210-2 is configured to operate actuator 216-1 based at least in part on value(s) read from FT component 214-1.

Third graphical element 210-3 represents a third real world DCN (not depicted) that includes an actuator 216-2 registered to the alias "AUX VALVE." As shown by GUI 228, the third real world DCN represented by third graphical element 210-3 is also subscribed to one or more I/O channels of the DCN represented by graphical element 210-1. In particular, third DCN 210-3 is subscribed to the MAIN TEMP alias. This may be because, for instance, third DCN 210-3 is configured to operate actuator 216-2 based at least in part on value(s) read from thermometer 218-1.

Referring now to FIG. 2B, assume that thermometer 218-1 registered to the alias MAIN TEMP has become unavailable, e.g., because it malfunctioned or has been deactivated. In various implementations, this change in state of the process automation network may be detected by alias visualization module 107. For instance, alias visualization module 107 may query process automation management system 102, GDS 104, and/or one or more of DCNs 210-1 to 210-3 for alias registration data. If thermometer 218-1 was properly unregistered with GDS 104, such an irregularity may be detected by, for instance, comparing local alias registration data of third DCN 210-3 with global alias registration data obtained from GDS 104. If thermometer 218-1 was deactivated without being properly unregistered with GDS 104, such an irregularity may be determined by, for instance, requesting a heartbeat signal from thermometer 218-1 (or from first DCN 210-1 on behalf of thermometer 218-1).

Based on the detected irregularity, alias visualization module 107 may cause GUI 228 to be updated so that an arrow representing the subscription of third DCN 210-3 to thermometer 218-1 (via the alias MAIN TEMP) is visually emphasized. In FIG. 2B, for instance, the arrow is now rendered in dashed line, and a warning annotation 230 is rendered on top of the arrow. In some implementations, warning annotation 230 (and other annotations described herein) may be interactive. A user may actuate or otherwise select warning annotation, e.g., using a pointer device such as a mouse or by tapping a graphical element rendered on a touchscreen, and one or more candidate responsive actions may be presented for selection, e.g., in a drop down menu, pop-up window, etc.

FIG. 2C depicts another example of how techniques described herein may be implemented to render a GUI configured with selected aspects of the present disclosure. This time, instead of thermometer 218-1 being deactivated, it is replaced at first DCN 210-1 with a second thermometer 218-2 that is registered to the alias, "AUX TEMP." First thermometer 218-1 is moved to a new DCN 210-4 and remains registered to the alias, "MAIN TEMP." Third DCN 210-3 remains subscribed to the MAIN TEMP alias; however, local alias registration data of third DCN 210-3 has not been updated. This may result in third DCN 210-3 retrieving data from second thermometer 218-2 instead of first thermometer 218-1, which could lead to negative outcomes or even catastrophic failure.

Alias visualization module 107 may detect this irregularity in various ways. In some implementations, alias visualization module 107 may analyze the local alias registration data of third DCN 210-3 and global alias registration data obtained from GDS 104. Based on the local alias registration data, alias visualization module 107 may determine that third DCN 210-3 remains subscribed to the connection string previously associated with the alias MAIN TEMP while first thermometer 218-1 was still part of first DCN 210-1. Based on the global alias registration data, alias visualization module 107 may determine that a new connection string of thermometer 218-1 hosted by fourth DCC 210-4 has since been registered to the MAIN TEMP alias. In other words, alias visualization module 107 may determine that third DCN 210-3 is subscribed to the wrong connection string, and hence, to the wrong I/O channel (second thermometer 218-2) instead of the correct I/O channel (first thermometer 218-1).

Based on this detected irregularity, alias visualization module 107 may update GUI 228 in various ways. In FIG. 2C, for instance, GUI 228 has been updated so that the subscription arrow from third DCN 210-3 to second thermometer 218-2 (which as noted above is incorrect) is visually emphasized, e.g., with dashed lines and/or an annotation 230. Additionally or alternatively, a new MAIN TEMP subscription line is suggested from third DCN 210-3 to first thermometer 218-1 which is now hosted by fourth DCN 210-4.

Figure 3:
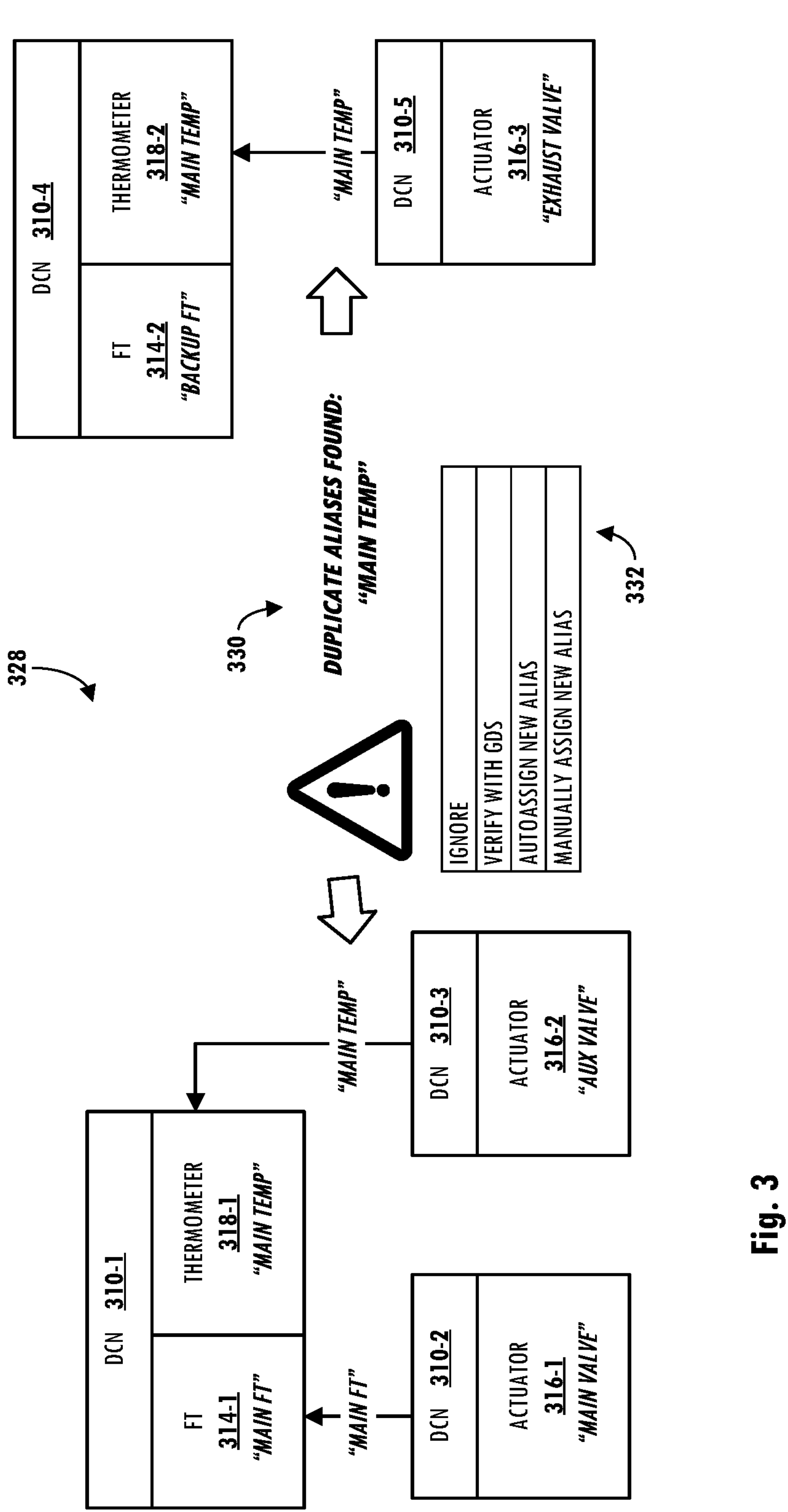
FIG. 3 schematically illustrates another example of how techniques described herein may be implemented.

FIG. 3 depicts another example of how selected aspects of the present disclosure may be implemented in a particular situation. In FIG. 3, the GUI 328 depicts DCNs 310-1 to 310-3 on the left with components that correspond to those of DCNs 210-1 to 210-3 in FIG. 2A. Additional DCNs 310-4 and 310-5 are rendered depicted by GUI 328 on the right. Fourth DCN 310-4 includes another FT component 314-2 registered to the alias, "BACKUP FT," and a second thermometer 318-2 registered to the alias, "MAIN TEMP." Thus, two different I/O channels, a first thermometer 318-1 and second thermometer 318-2, are registered to the same alias, "MAIN TEMP."

Fifth DCN 310-5 is subscribed to the second instance of MAIN TEMP that is registered to second thermometer 318-2. For instance, fifth DCN 310-5 may operate a third actuator 316-3 registered to the alias "EXHAUST VALVE" based on values fifth DCN 310-5 obtained via its subscription to the MAIN TEMP alias. While duplicate aliases such as those depicted in FIG. 3 may not always be expressly forbidden, they may nonetheless introduce confusion and/or increase the risk of negative outcomes. Accordingly, in FIG. 3, GUI has been updated to depict a warning annotation 330 that informs a user that duplicate aliases have been found. Warning annotation 330 includes arrows that point to the duplicate aliases.

In some implementations, warning annotation 330 may be interactive. In FIG. 3, for instance, selecting warning annotation 330 causes a menu 332 to appear in the form of a drop down menu that enumerates different response actions the user may take. In this example, these responsive actions include ignoring the warning (which may minimize or hide warning annotation 330), verify the duplicate aliases with the global discovery server, auto-assign a new alias to one or the other of the duplicate aliases, or manually assign a new alias to one or the other of the duplicate aliases. With auto-assignment, various changes may be implemented automatically, such as adding a number after the alias, creating a new alias based on another alias registered by a subscriber DCN (e.g., change "MAIN TEMP" on the right to "EXHAUST TEMP"), and so forth.

Figure 4:
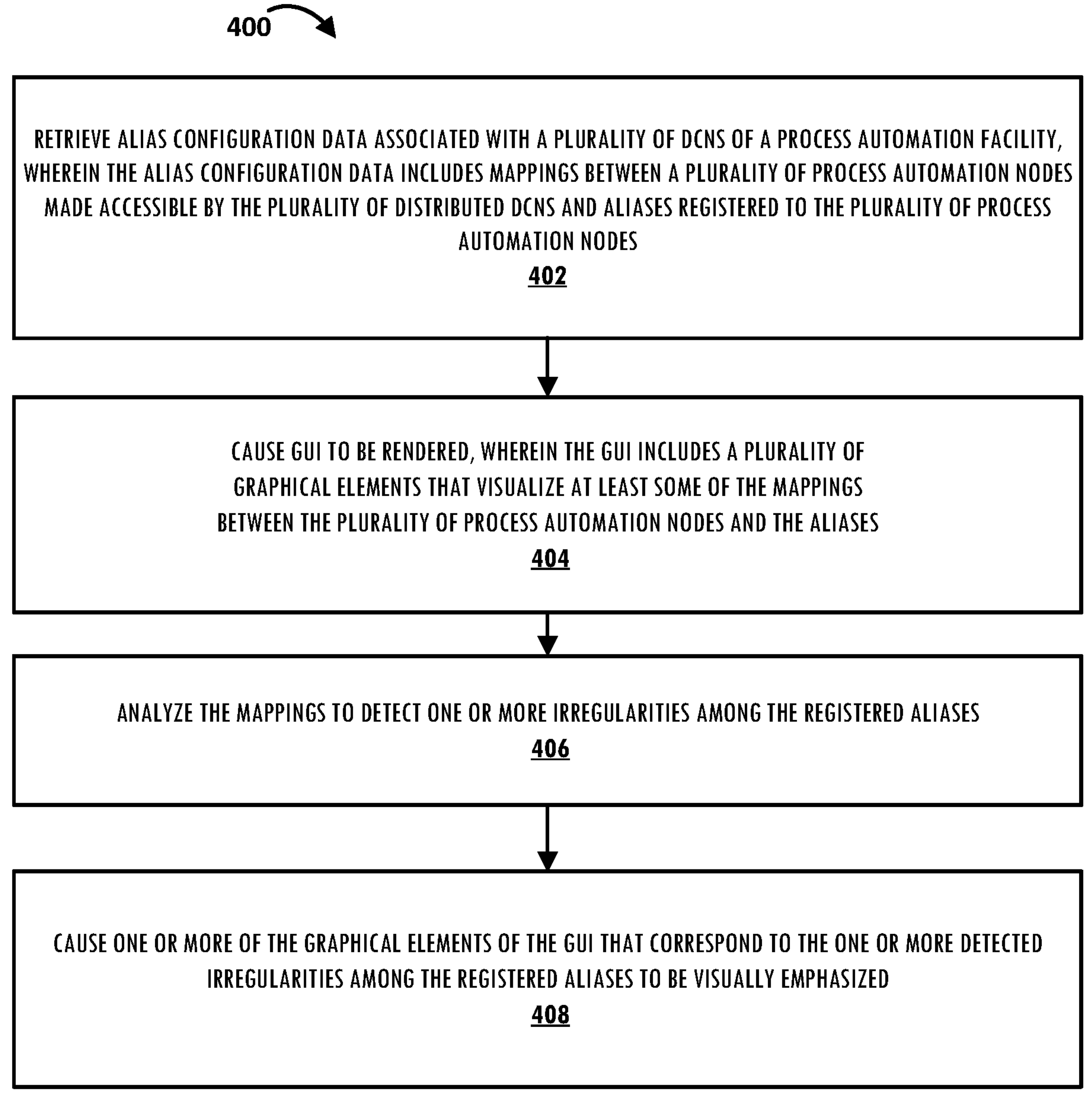
FIG. 4 schematically illustrates an example method for performing selected aspects of the present disclosure.

FIG. 4 is a flowchart illustrating an example method 400 of practicing selected aspects of the present disclosure, in accordance with implementations disclosed herein. For convenience, the operations of the flow chart are described with reference to a system that performs the operations. This system may include various components of various computer systems, such as one or more components of process automation management system 102, including alias visualization module 107. Moreover, while operations of method 400 are shown in a particular order, this is not meant to be limiting. One or more operations may be reordered, omitted or added.

At block 402, the system, e.g., by way of alias visualization module 107, may retrieve alias registration data associated with a plurality of DCNs (e.g., 110, 210, 310) of a process automation facility 108. In various implementations, the alias registration data may include global and/or local mappings between connection strings of a plurality of process automation nodes made accessible by the plurality of DCNs and aliases registered to the plurality of process automation nodes. In some implementations, the alias registration data may include, in addition to or instead of the DCNs themselves, cross-platform servers (e.g., OPC UA servers) executing on DCNs that control access to the plurality of process automation nodes. The plurality of process automation nodes may include, for instance, I/O channels and/or function blocks that execute on the DCNs.

At block 404, the system, e.g., by way of alias visualization module 107, may cause a GUI to be rendered, e.g., at client device 122-A and/or 122-B. In some implementations, the operations of block 404 may include alias visualization module 107 rendering output in a markup language such as the hypertext markup language (HTML) and/or the extensible markup language (XML) that can then be used by a web browser or similar application to render the GUI. Alternatively, alias visualization module 107 may provide similar data or other data to a propriety application operation on client device 122-A and/or 122-B. Whichever the case, the GUI may include a plurality of graphical elements that visualize at least some of the plurality of DCNs and at least some of the mappings between the connection strings of the plurality of process automation nodes and the aliases.

As shown in FIGS. 2A-C and 3, these graphical elements may, in some cases, take the form of nodes. Edges connecting the nodes may represent, for instance, subscriptions by DCNs (or more particularly, cross-platform clients executing thereon) to process automation nodes. While GUIs depicted and described herein have been two dimensional, this is not meant to be limiting. In various implementations, GUIs configured with selected aspects of the present disclosure may also be rendered in three dimensions (3D). Moreover, individual graphical elements may be operable to perform various actions. For example, clicking or tapping on a graphical element representing a particular DCN may cause any subscriptions to or from that DCN to be rendered, or if already rendered, visually emphasized, e.g., with animation, highlighting, different coloring, etc.

At block 406, the system, e.g., by way of alias visualization module 107, may analyze the mappings to detect one or more irregularities among the registered aliases. In some implementations, the operations of block 406 may include comparing global alias registration data (e.g., retrieved from GDS 104) with local alias registration data (e.g., retrieved from individual DCNs). Additionally or alternatively, in some implementations, the operations of block 406 may include comparing alias subscription data (which in some cases may be found in local alias registration data) to alias registration data (e.g., global alias registration data). In some implementations, the one or more detected irregularities may include a duplicate alias, which means the same alias being assigned to two different process automation nodes, such as two different I/O channels, two different function blocks, etc. Additionally or alternatively, the one or more detected irregularities may include an orphan alias assigned to a node such as an I/O channel or function block that is not available, e.g., because the I/O component or function block itself malfunctioned or was deactivated, or was moved, or because an entire DCN was deactivated, crashed, or even because the I/O channel or function block has yet to be added to the process automation network, etc.

At block 408, the system, e.g., by way of alias visualization module 107, may cause one or more of the graphical elements of the GUI that correspond to the one or more detected irregularities among the registered aliases to be visually emphasized. In FIGS. 2B-C, for instance, annotation 230 was added to call the user's attention to the detected irregularities. In FIG. 3, warning annotation 330 was provided for the same reasons.

FIG. 5 is a flowchart illustrating another example method 500 of practicing selected aspects of the present disclosure, in accordance with implementations disclosed herein. For convenience, the operations of the flow chart are described with reference to a system that performs the operations. This system may include various components of various computer systems, such as one or more components of process automation management system 102, including alias visualization module 107. Moreover, while operations of method

500 are shown in a particular order, this is not meant to be limiting. One or more operations may be reordered, omitted or added.

At block 502, the system, e.g., by way of alias visualization module 107, may retrieve alias subscription data associated with a plurality of DCNs (e.g., 110, 210, 310) of a process automation facility 108. In various implementations, the alias subscription data may include a list of subscriptions by at least some of the plurality of DCNs to aliases registered to connection strings of a plurality of process automation nodes made accessible by the plurality of DCNs. For example, local alias registration data of a DCN may include a list of aliases to which the DCN (or more particularly, a cross-platform client executing on the DCN) is subscribed, as well as connection strings to which those aliases are registered. As before, the process automation nodes may include, for instance, I/O channels and/or function blocks that execute on the DCNs.

At block 504, the system, e.g., by way of alias visualization module 107, may cause a GUI to be rendered. In various implementations, the GUI may include a plurality of graphical elements that visualize at least some of the plurality of DCNs (e.g., a nodes) and at least some of the subscriptions (e.g., as edges between the nodes).

At block 506, the system, e.g., by way of alias visualization module 107, may compare the alias subscription data to alias registration data to detect one or more irregularities. As noted elsewhere herein, the alias registration data may include mappings between connection strings of the plurality of process automation nodes and aliases registered to the plurality of process automation nodes. In some implementations, this alias registration data may be global alias registration data that alias visualization module 107 retrieves from GDS 104.

At block 508, the system, e.g., by way of alias visualization module 107, may, based on the one or more detected irregularities, cause the GUI to be updated to visually emphasize one or more of the graphical elements of the GUI that correspond to one or more detected irregularities. In various implementations, the operations of FIG. 508 may be similar to those described in relation to block 408.

Figure 6:
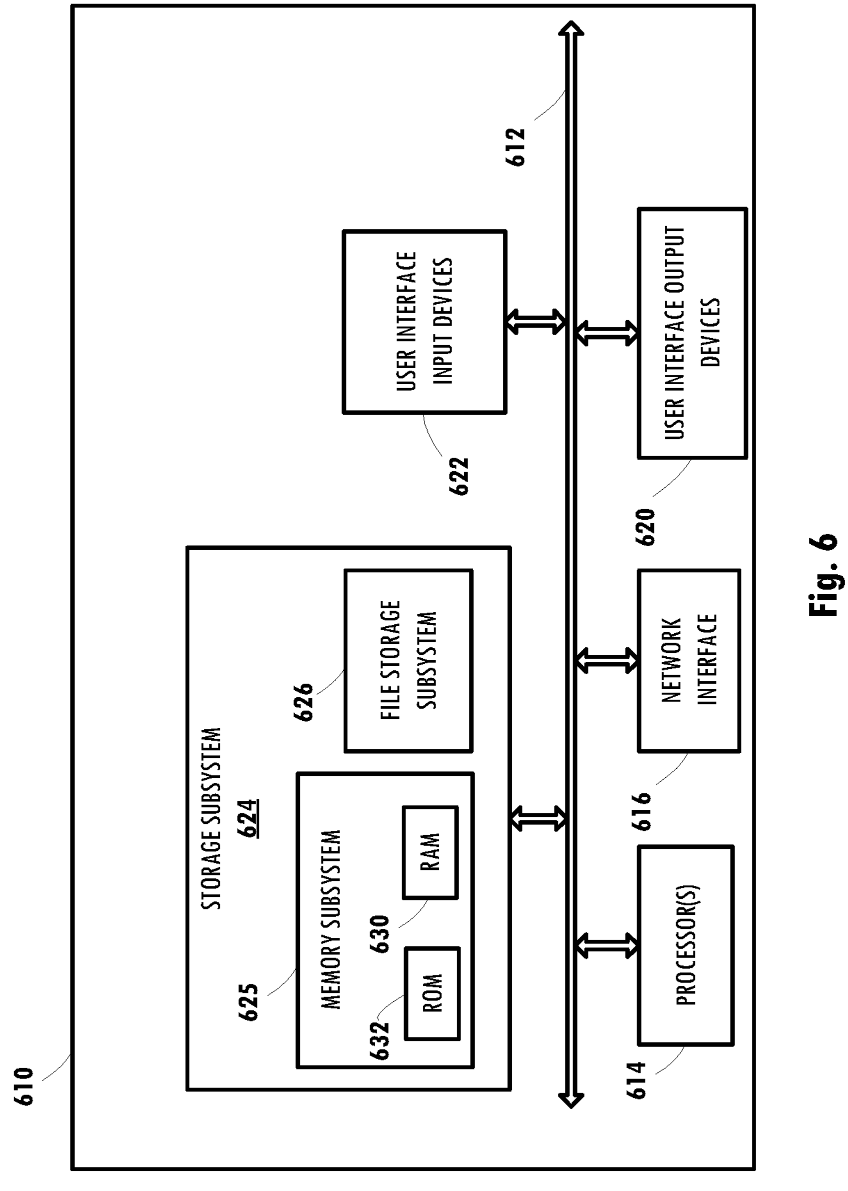
FIG. 6 schematically illustrates an example computer architecture on which selected aspects of the present disclosure may be implemented.

FIG. 6 is a block diagram of an example computing device 610 that may optionally be utilized to perform one or more aspects of techniques described herein. Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods of FIGS. 4 and 5, as well as to implement various components depicted in FIGS. 1-2.

These software modules are generally executed by processor 614 alone or in combination with other processors. Memory 625 used in the storage subsystem 624 can include a number of memories including a main random-access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors and comprising:

retrieving alias registration data associated with a plurality of distributed control nodes (DCNs) of a process automation facility, wherein the alias registration data includes mappings between connection strings of a plurality of process automation nodes made accessible by the plurality of DCNs and aliases registered to the plurality of process automation nodes, wherein the plurality of process automation nodes include input/output (I/O) channels and function blocks that execute on the plurality of DCNs;

causing a graphical user interface (GUI) to be rendered, wherein the GUI includes a plurality of graphical elements that visualize at least some of the plurality of DCNs and at least some of the mappings between the connection strings of the plurality of process automation nodes and the registered aliases;

analyzing the mappings to detect one or more irregularities in how the aliases are registered to the plurality of process automation nodes; and causing one or more of the graphical elements of the GUI that correspond to the one or more detected irregularities among the registered aliases to be visually emphasized.

2. The method of claim 1, wherein the one or more detected irregularities include the same alias being assigned to two different I/O channels.

3. The method of claim 1, wherein the one or more detected irregularities include an orphan alias assigned to an I/O channel that is unavailable.

4. The method of claim 1, wherein the alias registration data further comprises cross-platform servers that control access to the plurality of process automation nodes.

5. The method of claim 1, wherein the plurality of I/O channels include at least one sensor and at least one actuator.

6. The method of claim 1, wherein the mappings are retrieved from a global discovery server (GDS).

7. The method of claim 1, wherein the mappings are retrieved from at least some of the plurality of DCNs.

8. The method of claim 1, further comprising retrieving local alias registration data from one or more of the plurality of DCNs, wherein the local alias registration data comprises local mappings between subscribed-to aliases and process automation nodes to which the subscribed-to aliases are registered.

9. The method of claim 8, wherein at least some of the graphical elements of the GUI visualize at least some of the local mappings.

10. The method of claim 1, wherein one or more of the graphical elements of the GUI that correspond to the one or more detected irregularities among the registered aliases are rendered as interactive elements that, when actuated, cause candidate remedial actions to be presented for selection.

11. A method implemented using one or more processors and comprising:

retrieving alias subscription data associated with a plurality of distributed control nodes (DCNs) of a process automation facility, wherein the alias subscription data includes a list of subscriptions by at least some of the plurality of DCNs to aliases registered to a plurality of process automation nodes made accessible by the plurality of DCNs, wherein the plurality of process automation nodes include input/output (I/O) channels and function blocks that execute on the plurality of DCNs;

causing a graphical user interface (GUI) to be rendered, wherein the GUI includes a plurality of graphical elements that visualize at least some of the plurality of DCNs and at least some of the subscriptions;

comparing the alias subscription data to alias registration data to detect one or more irregularities in how the aliases are registered to the plurality of process automation nodes, wherein the alias registration data includes mappings between connection strings of the plurality of process automation nodes and the aliases registered to the plurality of process automation nodes; and based on the one or more detected irregularities, causing the GUI to be updated to visually emphasize one or more of the graphical elements of the GUI that correspond to one or more detected irregularities.

12. The method of claim 11, wherein the one or more detected irregularities include the same alias being assigned to two different I/O channels.

13. The method of claim 11, wherein the one or more detected irregularities include a DCN being subscribed to an orphan alias that is assigned to a process automation node that is unavailable.

14. The method of claim 11, wherein the plurality of I/O channels include at least one sensor and at least one actuator.

15. The method of claim 11, wherein the alias subscription data is retrieved from a global discovery server (GDS).

16. The method of claim 14, wherein the alias subscription data is retrieved from at least some of the plurality of DCNs.

17. The method of claim 11, wherein one or more of the graphical elements of the GUI that correspond to the one or more detected irregularities are rendered as interactive elements that, when actuated, cause candidate remedial actions to be presented for selection.

18. A system comprising one or more processors and memory storing instructions that, in response to execution by the one or more processors, cause the one or more processors to:

retrieve alias subscription data associated with a plurality of distributed control nodes (DCNs) of a process automation facility, wherein the alias subscription data includes a list of subscriptions by at least some of the plurality of DCNs to aliases registered to a plurality of process automation nodes made accessible by the plurality of DCNs, wherein the plurality of process automation nodes include input/output (I/O) channels and function blocks that execute on the plurality of DCNs;

cause a graphical user interface (GUI) to be rendered, wherein the GUI includes a plurality of graphical elements that visualize at least some of the plurality of DCNs and at least some of the subscriptions;

compare the alias subscription data to alias registration data to detect one or more irregularities in how the aliases are registered to the plurality of process automation nodes, wherein the alias registration data includes mappings between connection strings of the plurality of I/O channels and the aliases registered to the plurality of process automation nodes; and based on the one or more detected irregularities, cause the GUI to be updated to visually emphasize one or more of the graphical elements of the GUI that correspond to one or more detected irregularities.

19. The system of claim 18, wherein the one or more detected irregularities include the same alias being assigned to two different process automation nodes.

20. The system of claim 18, wherein the one or more detected irregularities include a DCN being subscribed to an orphan alias that is assigned to a process automation node that is unavailable.

* * * * *